Patented Sept. 11, 1923.

1,467,455

UNITED STATES PATENT OFFICE.

OSCAR F. SCHMID, OF JACKSON, MICHIGAN.

DENTIFRICE.

No Drawing. Application filed November 15, 1919, Serial No. 338,364. Renewed February 28, 1923.

*To all whom it may concern:*

Be it known that I, OSCAR F. SCHMID, a citizen of the United States, residing at the city and county of Jackson and State of Michigan, have invented certain new and useful Improvements in Dentifrices, of which the following is a specification.

This invention relates to improvements in dentifrices.

The objects of the invention are:

First, to provide an improved antiseptic dentifrice which shall be very effective in cleansing the teeth.

Second, to provide an improved composition dentifrice which will remain soft and sufficiently fluid for free use in a collapsible tube for an indefinite time.

Third, to provide in such an improved dentifrice a composition which shall be specially effective in preventing and removing the tartar from the teeth.

Further objects and objects relating to details will definitely appear from the detailed description to follow.

My improved dentifrice consists of the following ingredients:

| | |
|---|---|
| Chlorate potash | 12% |
| Precipitated calcium carbonate | 33% |
| Glycerine | 10% |
| Sugar | 10% |
| Mineral oil | 5% |
| Menthol | .5% |
| Flavoring | 1½% |
| Starch | 3% |
| Gum tragacanth | .5% |
| Water | 24½% |

I recommend first making a massing paste of the starch thereby thoroughly hydrating same, after which the other ingredients are thoroughly admixed and ground in an ordinary paint or roller grinding machine until the ingredients are all reduced to an impalpable smooth mixture. The oil is thereby emulsified.

It is found that, owing to the presence of the oil in which the other ingredients are thoroughly mixed and ground, the mixture will not harden in the tube but remains soft indefinitely; providing an antiseptic non-abrasive polishing dentifrice.

It is also found that by a repeated application of aforesaid oil or this dentifrice to teeth on which tartar has accumulated, the tartar becomes soft, crumbles and is removed by the brush in polishing the teeth. The mineral oil used is white and tasteless, being preferably white Russian mineral oil.

Having thus described my invention, what I claim as new and desire to secure by Letters Patent, is:

1. A tooth paste consisting of the following ingredients: chlorate of potash 12%, precipitated calcium carbonate 33%, glycerine 10%, sugar 10%, mineral oil 5%, menthol .5%, flavoring 1½%, starch 3%, gum tragacanth .5%, water 24½%.

2. A tooth paste containing chlorate of potash, preipitated calcium carbonate in a suitable body reduced to a paste, and a white tasteless mineral oil intermixed and emulsified therein.

3. A tooth paste containing chlorate of potash, precipitated calcium carbonate in a suitable body reduced to a paste, and a mineral oil intermixed and emulsified therein.

4. A tooth paste containing in its ingredients a substantial percentage of emulsified tasteless mineral oil.

In witness whereof I have hereunto set my hand and seal in the presence of two witnesses.

OSCAR F. SCHMID. [L. S.]

Witnesses:
HOWARD D. LITTLE,
FRANK P. HORNER.